(12) United States Patent
Lesso

(10) Patent No.: US 10,878,825 B2
(45) Date of Patent: Dec. 29, 2020

(54) BIOMETRIC PROCESSES

(71) Applicant: Cirrus Logic International Semiconductor Ltd., Edinburgh (GB)

(72) Inventor: John Paul Lesso, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 150 days.

(21) Appl. No.: 15/927,740

(22) Filed: Mar. 21, 2018

(65) Prior Publication Data

US 2019/0295554 A1   Sep. 26, 2019

(51) Int. Cl.
*G06F 21/32*   (2013.01)
*G10L 17/22*   (2013.01)
(Continued)

(52) U.S. Cl.
CPC ............. *G10L 17/22* (2013.01); *G06F 16/61* (2019.01); *G06F 16/683* (2019.01); *G06F 21/32* (2013.01);
(Continued)

(58) Field of Classification Search
CPC ............. G10L 15/22; G10L 15/26; G10L 2021/02166; G10L 15/063; G10L 25/78; G10L 15/20; G10L 15/265; G10L 15/00; G10L 17/04; G10L 2015/0631; G10L 15/065; G10L 2021/02165; G10L 21/00; G10L 21/0205; G10L 2015/0635; G10L 21/0208; G10L 15/18; G10L 2015/088; G10L 17/005; G10L 15/24; G10L 21/0232; G10L 2021/0575; G10L 13/00; G10L 2021/02168; G10L 21/0364; G10L 15/02; G10L 21/06
See application file for complete search history.

(56) References Cited

U.S. PATENT DOCUMENTS

| 2010/0106501 | A1 | 4/2010 | Miki et al. |
| 2012/0264091 | A1* | 10/2012 | Huber .................... G16H 20/30 434/185 |

(Continued)

FOREIGN PATENT DOCUMENTS

| CN | 106714023 A | 5/2017 |
| WO | 2007109989 A1 | 10/2007 |

OTHER PUBLICATIONS

International Search Report and Written Opinion of the International Searching Authority, International Application No. PCT/GB2019/050788.

(Continued)

*Primary Examiner* — Huyen X Vo
(74) *Attorney, Agent, or Firm* — Jackson Walker L.L.P.

(57) ABSTRACT

The present disclosure provides methods, systems, devices and computer program products for authenticating a user based on a comparison of audio signals to a stored voice model for an authorised user. In one aspect, a method comprises: obtaining a first audio signal that comprises a representation of a bone-conducted signal, wherein the bone-conducted signal is conducted via at least part of the user's skeleton; obtaining a second audio signal that comprises a representation of an air-conducted signal; and, responsive to a determination that the first audio signal comprises a voice signal, enabling updates to the stored voice model for the authorised user based on the second audio signal.

25 Claims, 9 Drawing Sheets

(51) Int. Cl.
  *G10L 17/06* (2013.01)
  *G10L 17/04* (2013.01)
  *G06F 16/61* (2019.01)
  *G06F 16/683* (2019.01)
  *G10L 17/10* (2013.01)
  *H04R 1/46* (2006.01)

(52) U.S. Cl.
  CPC .............. *G10L 17/04* (2013.01); *G10L 17/06* (2013.01); *G10L 17/10* (2013.01); *H04R 1/46* (2013.01)

(56) References Cited

U.S. PATENT DOCUMENTS

2013/0246064 A1 9/2013 Wasserblat et al.
2017/0220786 A1* 8/2017 Guo ..................... G06F 21/32

OTHER PUBLICATIONS

Tsuge, S., et al., "Speaker verification method using bone-conduction and air-conduction speech", International Symposium on Intelligent Signal Process and Communication Systems, 2009, IEEE, Piscataway, NJ Jan. 7, 2009, pp. 449-452.

* cited by examiner

BIOMETRIC PROCESSES

TECHNICAL FIELD

Embodiments of the present disclosure relate to methods, apparatus and systems for performing biometric processes, and particularly to methods, apparatus and systems for performing biometric processes involving authentication of a user based on the user's speech.

BACKGROUND

Biometric techniques are becoming increasingly common as a method for authenticating those users seeking to access a restricted area or device, or seeking to perform a restricted action. Various different biometric identifiers are known, including fingerprint recognition, iris recognition and face recognition.

Voice biometric systems authenticate a user based on the user's speech. Before using a voice biometric system for authentication, a user first enrolls with the system. During enrolment, the voice biometric system acquires biometric data that are characteristic of the user's voice and stores the data as a voice model or voice print. Authentication may be based on the particular word or phrase spoken during enrolment (text-dependent), or on speech which differs from that spoken during enrolment (text-independent). Authentication comprises the extraction of one or more biometric features from an input audio signal, and the comparison of those features with the stored voice prints. A determination that the acquired data match or are sufficiently close to a stored voice print results in successful authentication of the user. Successful authentication of a user may result in a user being permitted to carry out a restricted action or being granted access to a restricted area or device (for example). If the acquired features do not match or are not sufficiently close to a stored voice print, then the user is not authenticated and the authentication attempt is unsuccessful. An unsuccessful authentication attempt may prevent a user from being permitted to perform the restricted action or the user may be denied access to the restricted area or device.

The performance of a voice biometric system may be limited by variations in the user's voice which occur in the time period between enrolment and authentication. For example, a user's voice may vary as a result of ageing, illness or the time of day at which biometric data are acquired. If a user's voice changes sufficiently, the user may be rejected by the authentication system, even though they are authorised and should have been authenticated—a problem known as "false rejection". Voice biometric systems may account for changes in a user's voice by collecting additional biometric data at various intervals and using these data to update stored voice prints. This process is referred to as enrichment.

Enrichment may be a supervised or unsupervised process. Supervised enrichment involves prompting a user to re-enroll with the system at various intervals. For example, the user may be asked to repeat a particular word or phrase and the resulting data may be used to update a stored voice print. Prior to this process the identity of the user is established using one or more authentication techniques (for example, the user may be asked to input a password or pin number). Whilst supervised enrichment offers a robust approach for updating stored voice prints, it requires the user to actively participate in the enrichment process.

In contrast, unsupervised enrichment uses any speech from the user to update a stored voice print without the user's explicit knowledge. The biometric data may be collected during routine use, without needing to prompt the user to provide additional input. Accordingly, unsupervised enrichment allows stored voice prints to be updated more frequently, thereby improving the performance of the voice biometric system.

For unsupervised enrichment to be used effectively, it is important that only the user's speech is used to update the user's stored voice print. If a voice print is erroneously updated using, for example, speech from another speaker, the effectiveness of the voice biometric system may be compromised and the user may experience more frequent false rejections. As well as inconveniencing the user, erroneously updating a stored voice print may also pose a significant security risk. Therefore, for unsupervised enrichment to be implemented successfully in a voice biometric system, the voice biometric system should be able to differentiate between the user's speech and other audio detected by the system (for example, speech from other speakers).

Embodiments of the present disclosure seek to address this and other problems.

SUMMARY

One aspect of the disclosure provides a method in a biometric authentication system, the biometric authentication system for authenticating a user based on a comparison of audio signals to a stored voice model for an authorised user. The method comprises: obtaining a first audio signal that comprises a representation of a bone-conducted signal, wherein the bone-conducted signal is conducted via at least part of the user's skeleton; obtaining a second audio signal that comprises a representation of an air-conducted signal; and, responsive to a determination that the first audio signal comprises a voice signal, enabling updates to the stored voice model for the authorised user based on the second audio signal.

Another aspect provides a biometric authentication system for authenticating a user based on a comparison of audio signals to a stored voice model for an authenticated user. The biometric authentication system comprises: a first input for obtaining a first audio signal, the first audio signal comprising a representation of a bone-conducted signal, wherein the bone-conducted signal is conducted via at least part of the user's skeleton; a second input for obtaining a second audio signal, the second audio signal comprising a representation of an air-conducted signal; and an enablement module operable to determine whether the first audio signal comprises a voice signal and to enable updates to the stored voice model for the authorised user based on the second audio signal, responsive to a determination that the first audio signal comprises a voice signal.

A further aspect provides an electronic apparatus, for authenticating a user based on a comparison of audio signals to a stored voice model for an authenticated user. The electronic apparatus comprises processing circuitry and a non-transitory machine-readable medium storing instructions which, when executed by the processing circuitry, cause the electronic apparatus to: obtain a first audio signal that comprises a representation of a bone-conducted signal, wherein the bone-conducted signal is conducted via at least part of the user's skeleton; obtain a second audio signal that comprises a representation of an air-conducted signal; and, responsive to a determination that the first audio signal comprises a voice signal, enable updates to the stored voice model for the authorised user based on the second audio signal.

Another aspect provides a non-transitory machine-readable medium for authenticating a user based on a comparison of audio signals to a stored voice model for an authenticated user. The medium stores instructions which, when executed by processing circuitry, cause an electronic apparatus to: obtain a first audio signal that comprises a representation of a bone-conducted signal, wherein the bone-conducted signal is conducted via at least part of the user's skeleton; obtain a second audio signal that comprises a representation of an air-conducted signal; and, responsive to a determination that the first audio signal comprises a voice signal, enable updates to the stored voice model for the authorised user based on the second audio signal.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Embodiments of the disclosure provide methods, apparatus and computer programs for enriching or updating a stored voice model (also known as a template or voiceprint) for an authorised user of a biometric authentication system. Embodiments make use of bone-conducted voice signals (e.g., voice signals which have been conducted at least partially via part of the user's skeleton, such as the jaw bone) to identify when the user is speaking, and enable updates to the stored voice model. For example, a method may comprise obtaining first and second audio signals comprising representations, respectively, of a bone-conducted signal and an air-conducted signal. Responsive to a determination that the first audio signal comprises a voice signal, updates to the stored voice model may be enabled based on the second audio signal. Further embodiments may comprise enabling updates to the stored voice model responsive to a determination that the second audio signal comprises a voice signal, or responsive to a determination that the first and second audio signals comprise respective voice signals which correlate with each other.

Embodiments of the disclosure may be implemented in a variety of different electronic devices and systems. FIGS. 1a to 1f show examples of personal audio devices which can be used to implement aspects of the disclosure. As used herein, the term "personal audio device" is any electronic device which is suitable for, or configurable to, provide audio playback substantially to only a single user. Some examples of suitable personal audio devices are shown in FIGS. 1a to 1f.

Figure 1A:
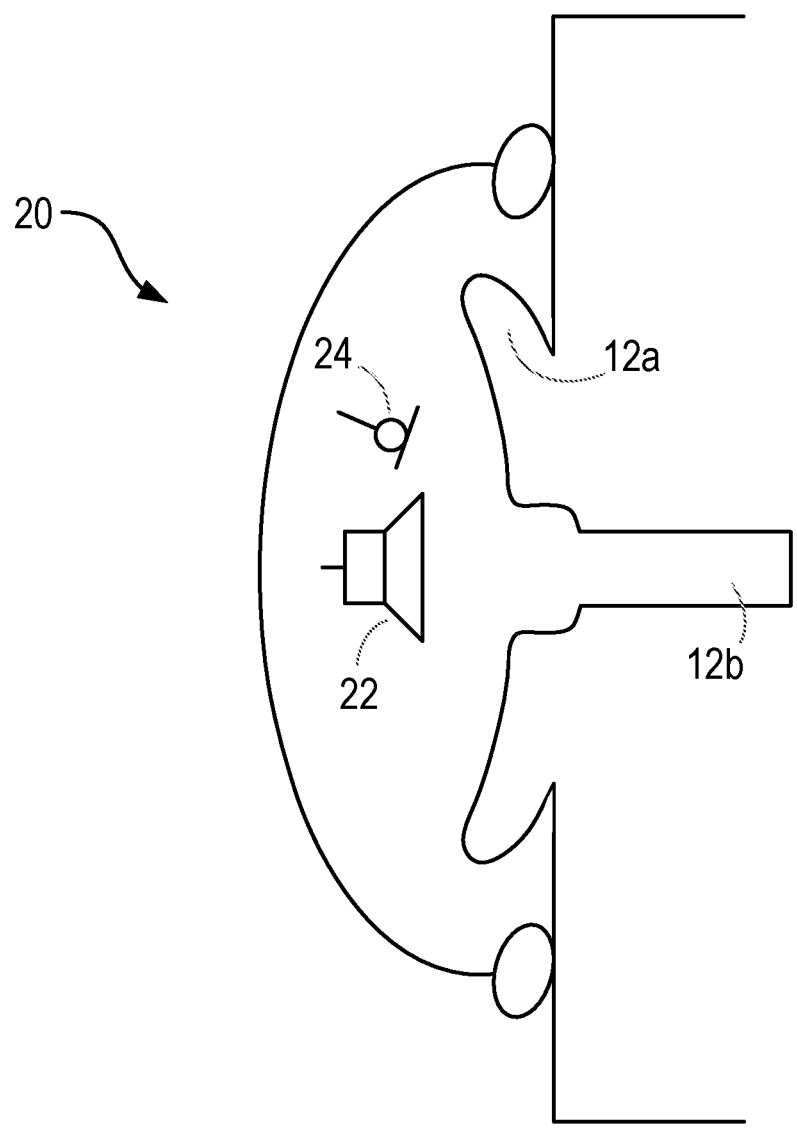
FIGS. 1a to 1f show personal audio devices according to embodiments of the disclosure.

FIG. 1a shows a schematic diagram of a user's ear, comprising the (external) pinna or auricle 12a, and the (internal) ear canal 12b. A personal audio device 20 comprising a circumaural headphone is worn by the user over the ear. The headphone comprises a shell which substantially surrounds and encloses the auricle 12a, so as to provide a physical barrier between the user's ear and the external environment. Cushioning or padding may be provided at an edge of the shell, so as to increase the comfort of the user, and also the acoustic coupling between the headphone and the user's skin (i.e. to provide a more effective barrier between the external environment and the user's ear).

The headphone comprises one or more loudspeakers 22 positioned on an internal surface of the headphone, and arranged to generate acoustic signals towards the user's ear and particularly the ear canal 12b. The headphone further comprises one or more microphones 24, also positioned on the internal surface of the headphone, arranged to detect acoustic signals within the internal volume defined by the headphone, the auricle 12a and the ear canal 12b. These microphones 24 may be operable to detect bone-conducted voice signals.

The headphone may be able to perform active noise cancellation, to reduce the amount of noise experienced by the user of the headphone. Active noise cancellation operates by detecting the noise (i.e. with a microphone), and generating a signal (i.e. with the loudspeaker) that has the same amplitude as the noise signal but is opposite in phase. The generated signal thus interferes destructively with the noise and so lessens the noise experienced by the user. Active noise cancellation may operate on the basis of feedback signals, feedforward signals, or a combination of both. Feedforward active noise cancellation utilizes one or more microphones on an external surface of the headphone, operative to detect the environmental noise before it reaches the user's ear. The detected noise is processed quickly, and the cancellation signal generated so as to match the incoming noise as it arrives at the user's ear. Feedback active noise cancellation utilizes one or more error microphones positioned on the internal surface of the headphone, operative to detect the combination of the noise and the audio playback signal generated by the one or more loudspeakers. This combination is used in a feedback loop, together with knowledge of the audio playback signal, to adjust the cancelling signal generated by the loudspeaker and so reduce the noise. The microphone 24 shown in FIG. 1a may therefore form part of an active noise cancellation system, for example, as an error microphone.

The personal audio device 20 may comprise, or be used in conjunction with, a voice microphone provided to capture an air-conducted representation of the user's voice. See FIG. 1f for more details.

Figure 1B:
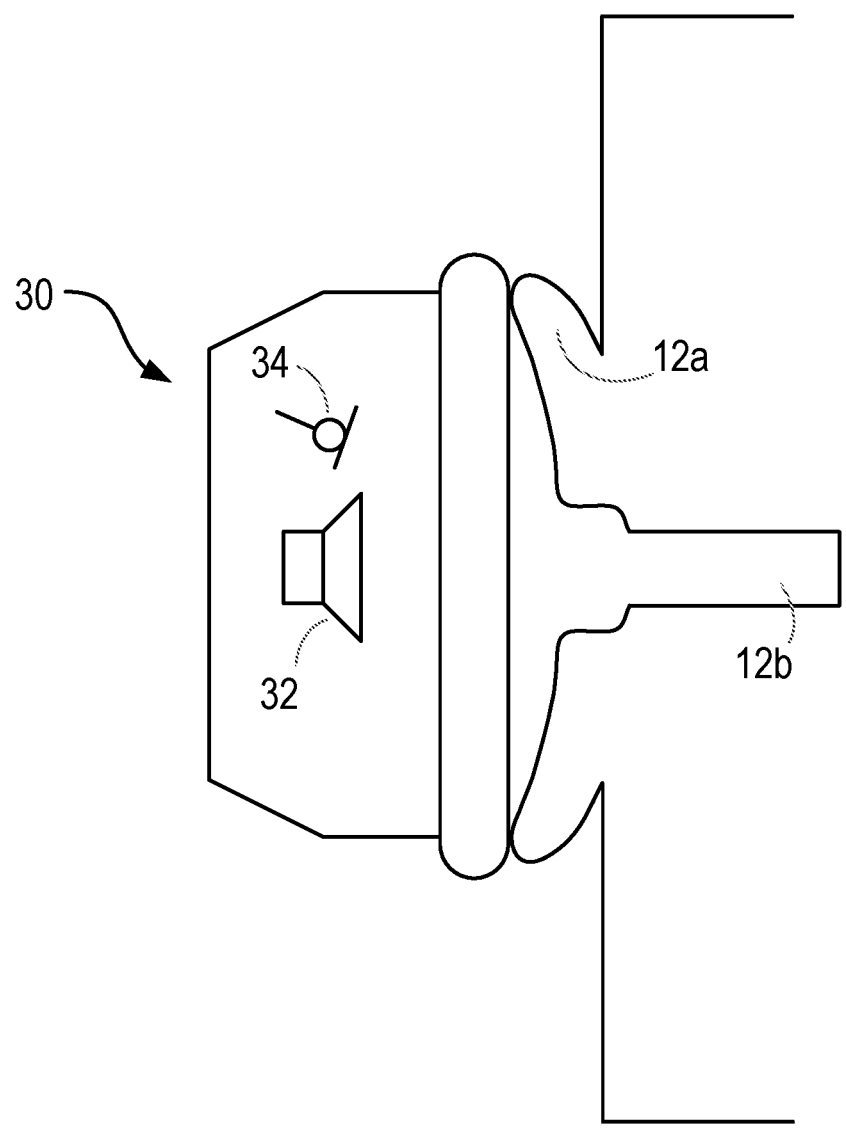

FIG. 1b shows an alternative personal audio device 30, comprising a supra-aural headphone. The supra-aural headphone does not surround or enclose the user's ear, but rather sits on the auricle 12a. The headphone may comprise a cushion or padding to lessen the impact of environmental noise. As with the circumaural headphone shown in FIG. 1a, the supra-aural headphone comprises one or more loudspeakers 32 and one or more microphones 34. The loudspeaker(s) 32 and the microphone(s) 34 may form part of an active noise cancellation system, with the microphone 34 serving as an error microphone.

Figure 1C:
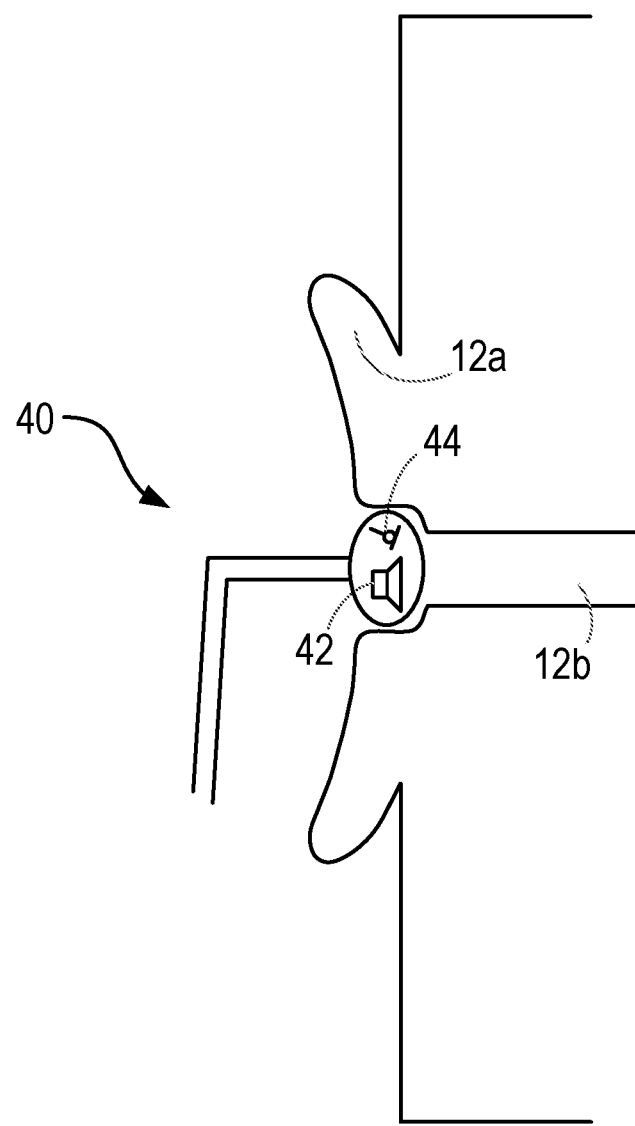

FIG. 1c shows a further alternative personal audio device 40, comprising an intra-concha headphone (or earphone). In use, the intra-concha headphone sits inside the user's concha cavity. The intra-concha headphone may fit loosely within the cavity, allowing the flow of air into and out of the user's ear canal 12b.

As with the devices shown in FIGS. 1a and 1b, the intra-concha headphone comprises one or more loudspeakers 42 and one or more microphones 44, which may form part of an active noise cancellation system.

Figure 1D:
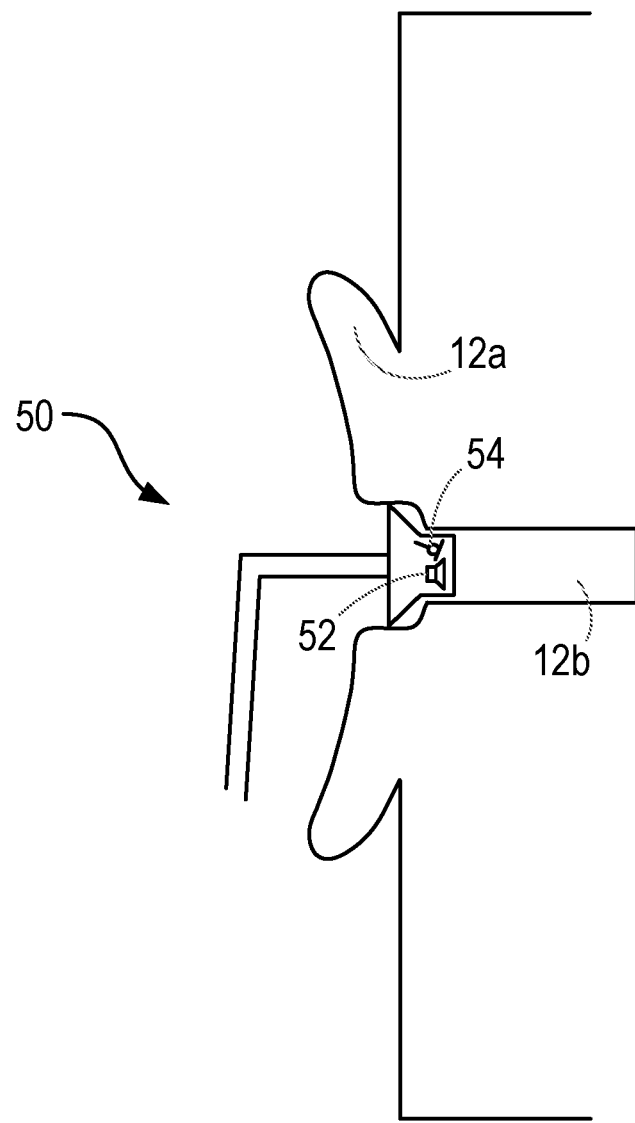

FIG. 1*d* shows a further alternative personal audio device 50, comprising an in-ear headphone (or earphone), insert headphone, or ear bud. This headphone is configured to be partially or totally inserted within the ear canal 12*b*, and may provide a relatively tight seal between the ear canal 12*b* and the external environment (i.e. it may be acoustically closed or sealed). The headphone may comprise one or more loudspeakers 52 and one or more microphones 54, as with the other devices described above, and these components may form part of an active noise cancellation system.

As the in-ear headphone may provide a relatively tight acoustic seal around the ear canal 12*b*, external noise (i.e. coming from the environment outside) detected by the microphone 54 is likely to be low.

Figure 1E:
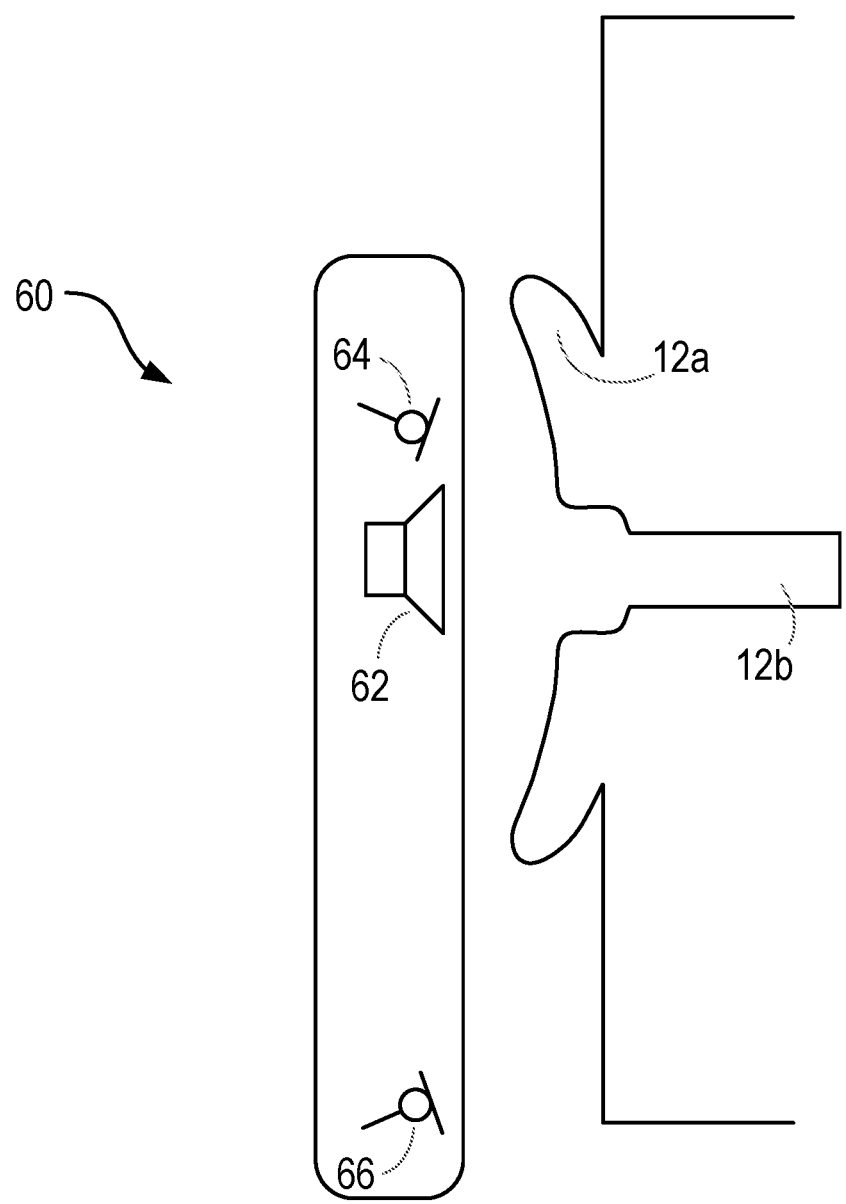

FIG. 1*e* shows a further alternative personal audio device 60, which is a mobile or cellular phone or handset. The handset 60 comprises one or more loudspeakers 62 for audio playback to the user, and one or more microphones 64 which are similarly positioned.

In use, the handset 60 is held close to the user's ear so as to provide audio playback (e.g. during a call). While a tight acoustic seal is not achieved between the handset 60 and the user's ear, the handset 60 is typically held close enough that the one or more microphones 64 may be able to detect bone-conducted voice signals. As with the other devices, the loudspeaker(s) 62 and microphone(s) 64 may form part of an active noise cancellation system.

The handset 60 further comprises a voice microphone 66 positioned at, or close to, an opposing end of the handset to the loudspeaker(s) 62 and microphone(s) 64. When held close to the user's face in use, therefore, the voice microphone 66 is relatively close to the user's mouth and can detect the user's speech conducted via the air.

All of the personal audio devices described above thus provide audio playback to substantially a single user in use. Each device is further operable to detect bone-conducted voice signals through the respective microphones 24, 34, 44, 54 and 64.

Figure 1F:
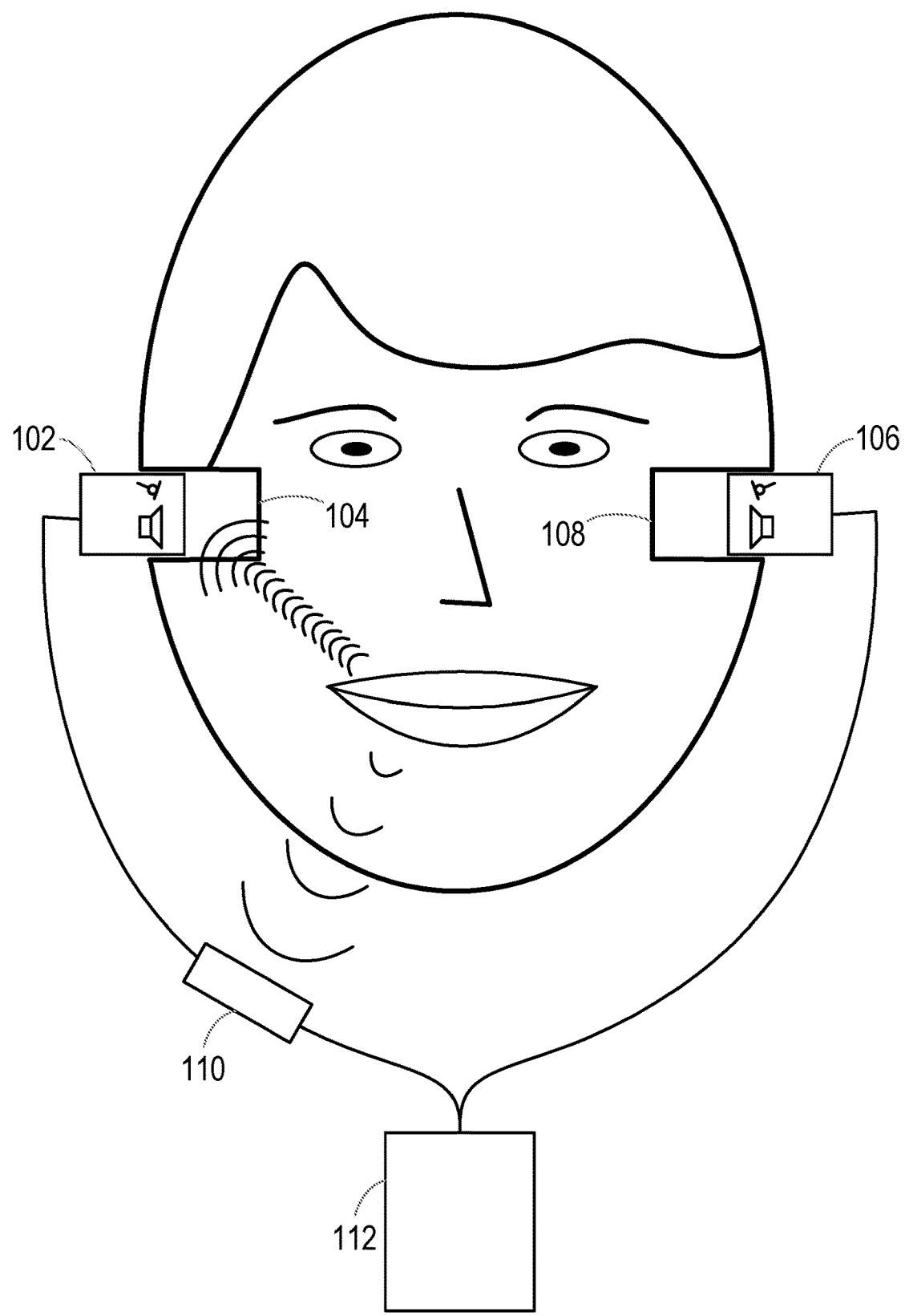

FIG. 1*f* shows the application of a personal audio device (in this case having a similar construction to personal audio device 50) to a user. The user has two ear canals 104, 108. A first in-ear headphone 102 (comprising a first loudspeaker or other audio transducer, and a first microphone or other transducer) is inserted into the first ear canal 104, while a second in-ear headphone 106 (comprising a second loudspeaker or other audio transducer, and a second microphone) is inserted into the second ear canal 108.

A voice microphone 110 is also provided which is positioned externally to the ear. In the illustrated embodiment, the voice microphone 110 is coupled to the first and second headphones 102, 106 via a wired connection. However, the voice microphone 110 may be positioned anywhere that is suitable to detect the voice of the user as conducted through the air, e.g. on an external surface of one or more of the headphones 102, 106. The voice microphones 110 may be coupled to the first and second headphones 102, 106 via a wireless connection. The headphones 102, 106 and voice microphone 110 are further coupled to a host electronic device 112. The host electronic device 112 may be a smartphone or other cellular or mobile phone, a media player, etc. In some embodiments, processing may be carried out within one of the headphones 102, 106, such that the host electronic device 112 is unnecessary. It will be further noted that, although FIG. 1*f* shows two headphones 102, 106, only a single headphone may be provided in some embodiments, or signals from a single one of the two headphones 102, 106 may be used for the processing described below.

As the user speaks, his or her voice is carried through the air to the voice microphone 110 where it is detected. In addition, the voice signal is carried through part of the user's skeleton or skull, such as the jaw bone, and coupled to the ear canal. The microphones in the headphones 102, 106 thus detect a bone-conducted voice signal.

It will be understood by those skilled in the art that the microphones or other transducers (such as accelerometers) detecting the bone-conducted signal may be the same as microphones or other transducers provided as part of an active noise cancellation system (e.g. to detect an error signal). Alternatively, separate microphones or transducers may be provided for these individual purposes (or combinations of purposes) in the personal audio devices described above.

All of the devices shown in FIGS. 1*a* to 1*f* and described above may be used to implement aspects of the disclosure.

Figure 2:
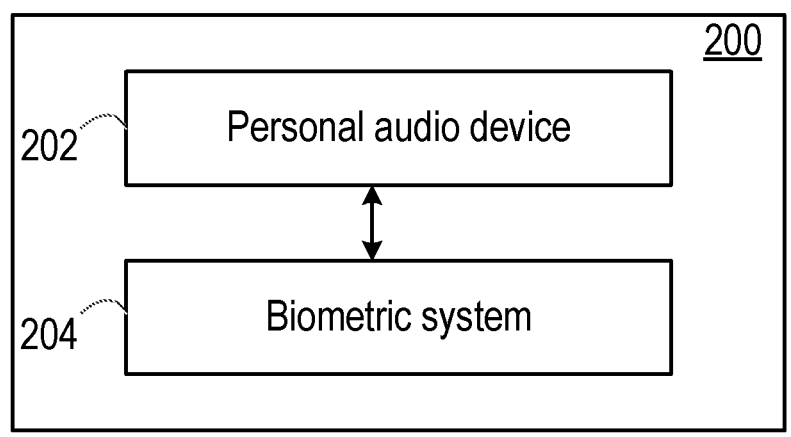
FIG. 2 is a schematic diagram showing an arrangement according to embodiments of the disclosure.

FIG. 2 shows an arrangement 200 according to embodiments of the disclosure. The arrangement 200 comprises a personal audio device 202 and a biometric system 204. The personal audio device 202 may be any device which is suitable for, or configured to detect bone-conducted and air-conducted voice signals from a user. The bone-conducted voice signals, by their nature, originate essentially from a single user (i.e. the user of the personal audio device). The air-conducted voice signals may comprise additional voice signals from nearby speakers, depending on the environment around the device 202. The personal audio device 202 comprises first and second microphones which, in use, are positioned respectively adjacent to or within a user's ear (so as to detect bone-conducted audio signals) and adjacent to a user's mouth (so as to detect air-conducted audio signals). The personal audio device may be wearable, and comprise headphones for each of the user's ears. Alternatively, the personal audio device may be operable to be carried by the user, and held adjacent to the user's ear or ears during use. The personal audio device may comprise headphones or a mobile phone handset, as described above with respect to any of FIGS. 1*a* to 1*f*.

The biometric system 204 is coupled to the personal audio device 202 and thus receives biometric data which is indicative of the individual using the personal audio device. In some embodiments, the biometric system 204 may be operable to control the personal audio device 202 to acquire the biometric data.

For example, the personal audio device 202 may acquire bone-conducted voice signals and output the signals to the biometric system 204 for processing. For example, the personal audio device 202 may acquire air-conducted voice signals and output the signals to the biometric system 204 for processing. For example, the personal audio device 202 may acquire voice biometric data and output the signals to the biometric system 204 for processing.

The biometric system 204 may send suitable control signals to the personal audio device 202, so as to initiate the acquisition of biometric data, and receive biometric data from the personal audio device 202. The biometric system 204 is operable to extract one or more features from the biometric data and utilize those features as part of a biometric process.

Some examples of suitable biometric processes include biometric enrolment and biometric authentication. Enrolment comprises the acquisition and storage of biometric data which is characteristic of an individual. In the present context, such stored data may be known as a "voice print". Authentication comprises the acquisition of biometric data from an individual, and the comparison of that data to the stored data of one or more enrolled or authorised users. A positive comparison (i.e. the acquired data matches or is sufficiently close to a stored voice or ear print) results in the individual being authenticated. For example, the individual may be permitted to carry out a restricted action, or granted access to a restricted area or device. A negative comparison (i.e. the acquired data does not match or is not sufficiently close to a stored voice or ear print) results in the individual not being authenticated. For example, the individual may not be permitted to carry out the restricted action, or granted access to the restricted area or device.

The biometric system 204 may, in some embodiments, form part of the personal audio device 202 itself. Alternatively, the biometric system 204 may form part of an electronic host device (e.g. an audio player) to which the personal audio device 202 is coupled, through wires or wirelessly. In yet further embodiments, operations of the biometric system 204 may be distributed between circuitry in the personal audio device 202 and the electronic host device.

Figure 3:
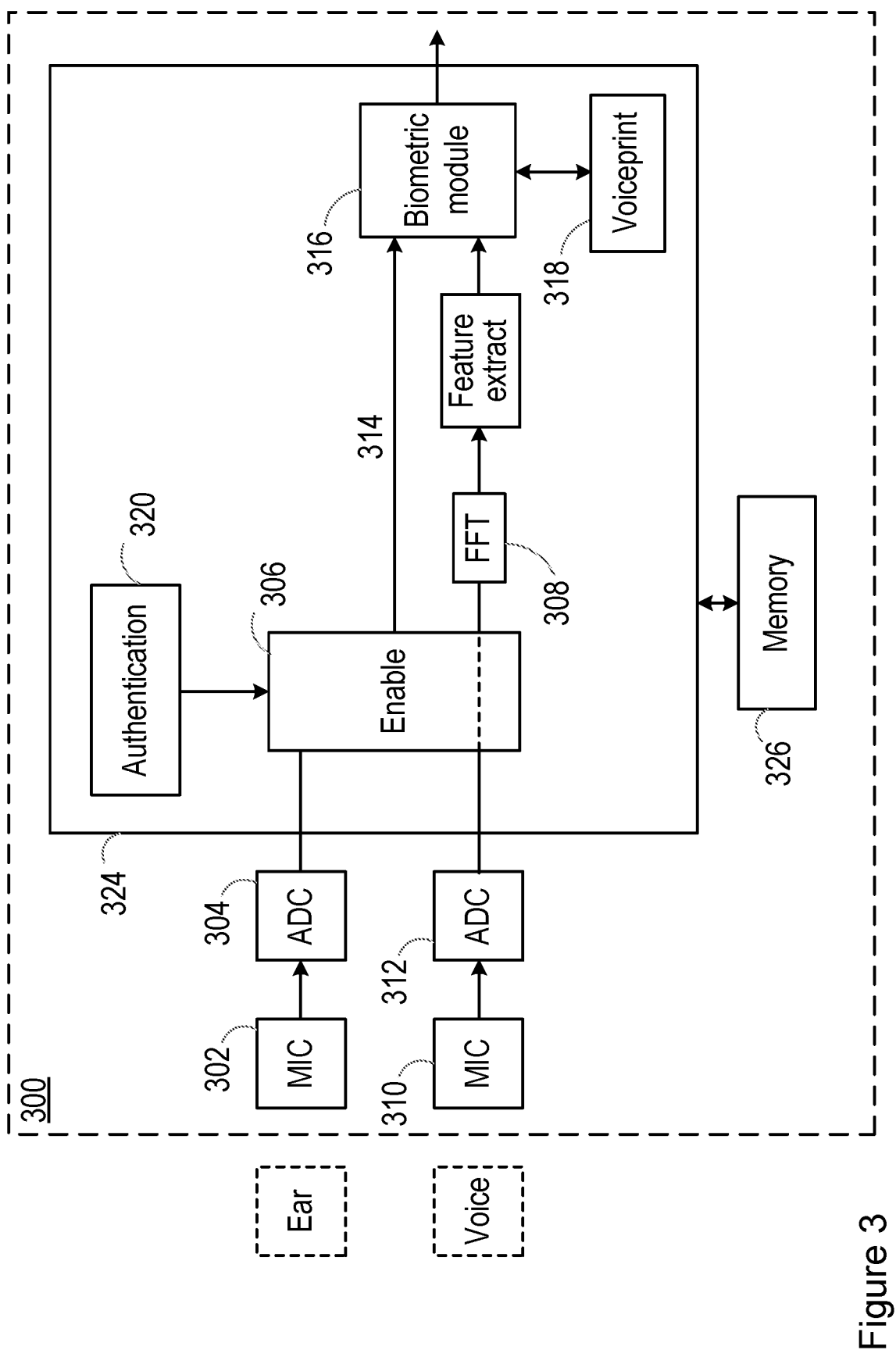
FIG. 3 shows a system according to embodiments of the disclosure.

FIG. 3 shows a system 300 according to embodiments of the disclosure.

The system 300 comprises processing circuitry 324, which may comprise one or more processors, such as a central processing unit or an applications processor (AP), or a digital signal processor (DSP). The system 300 further comprises memory 326, which is communicably coupled to the processing circuitry 324. The memory 326 may store instructions which, when carried out by the processing circuitry 324, cause the processing circuitry to carry out one or more methods as described below (see FIG. 4 for example).

The one or more processors may perform methods as described herein on the basis of data and program instructions stored in memory 326. Memory 326 may be provided as a single component or as multiple components or co-integrated with at least some of processing circuitry 324. Specifically, the methods described herein can be performed in processing circuitry 324 by executing instructions that are stored in non-transient form in the memory 326, with the program instructions being stored either during manufacture of the system 300 or personal audio device 202 or by upload while the system or device is in use.

The system 300 comprises a first microphone 302, which may belong to a personal audio device (i.e. as described above). The first microphone 302 may be configurable for placement within or adjacent to a user's ear in use, and is termed "ear microphone 302" hereinafter. The ear microphone 302 may be operable to detect bone-conducted voice signals from the user, as described above.

The processing circuitry 324 comprises an analogue-to-digital converter (ADC) 304, which receives the electrical audio signal detected by the ear microphone and converts it from the analogue domain to the digital domain. Of course, in alternative embodiments the ear microphone 302 may be a digital microphone and produce a digital data signal (which does not therefore require conversion to the digital domain).

The system 300 further comprises a second microphone 310, which may belong to the personal audio device 202 (i.e. as described above). The second microphone 310 may be configurable for placement external to the user's ear in use. The second microphone 310 is termed "voice microphone 310" hereinafter. The voice microphone 310 may be operable to detect air-conducted voice signals from the user, as described above. The processing circuitry 324 also comprises an ADC 312 in respect of the audio signals detected by the voice microphone 310 (unless the voice microphone 310 is a digital microphone producing a digital data signal, as discussed above).

The output of the ADC 304 (i.e. the bone-conducted audio signal) is passed to an enablement module 306. The output of the ADC 312 (i.e. the air-conducted audio signal) is optionally also passed to the enablement module 306. Operation of the enablement module 306 will be described in more detail below.

The system implements a voice biometric authentication algorithm. Thus, the air-conducted audio signal is also used for performing voice biometric authentication.

The signal detected by the voice microphone 310 is in the time domain. However, the features extracted for the purposes of the biometric process may be in the frequency domain (in that it is the frequencies of the user's voice which are characteristic). The processing circuitry 324 therefore comprises a Fourier transform module 308, which converts the reflected signal to the frequency domain. For example, the Fourier transform module 308 may implement a fast Fourier transform (FFT).

The transformed signal is then passed to a feature extract module 314, which extracts one or more features of the transformed signal for use in a biometric process (e.g. biometric enrolment, biometric authentication, etc). For example, the feature extract module 314 may extract one or more mel frequency cepstrum coefficients. Alternatively, the feature extract module may determine the amplitude or energy of the user's voice at one or more predetermined frequencies, or across one or more ranges of frequencies. The extracted features may correspond to data for a model of the user's voice.

The extracted feature(s) are passed to a biometric module 316, which performs a biometric process on them. For example, the biometric module 316 may perform a biometric enrolment, in which the extracted features (or parameters derived therefrom) are stored as part of biometric data which is characteristic of the individual. The biometric data may be stored in a memory module 318 provided within the system or remote from the system (and accessible securely by the biometric module 316). Such stored data may be known as a "voice print". In another example, the biometric module 316 may perform a biometric authentication, and compare the one or more extracted features to corresponding features in the stored voice print (or multiple stored voice prints). Based on the comparison, a biometric score is generated which is indicative of the likelihood that a voice contained within the air-conducted voice signal corresponds to the voice of an authorised user. That score may be compared to a threshold, to determine whether the voice contained within the air-conducted voice signal is to be authenticated as the voice of an authorised user. For example, in one implementation, the voice may be authenticated when the biometric score exceeds the threshold; the voice may not be authenticated when the biometric score is less than the threshold.

As described above, embodiments of the disclosure relate to enrichment, or updating, of the stored voice print for the authorised user, and particularly relate to use of a bone-conducted audio signal to determine when an air-conducted audio signal comprises a voice of the user of the system. That is, the bone-conducted audio signal, owing to the position of the ear microphone 302 in use, is likely to contain only the voice of the user of the system 300. If other voices are present in the bone-conducted audio signal (e.g., due to other nearby speakers), the signals associated with those voices are likely to have much lower amplitude than the signals associated with the voice of the user. Thus a positive determination of the presence of a voice in the bone-conducted audio signal may be used to enable updates to or enrichment of the voice print for the authorised user.

Thus in one embodiment, the enable module 306 is operative to receive the bone-conducted audio signal from the ADC 304, and to generate an output control signal for the biometric module 316, enabling the biometric module 316 to update a stored voice model based on the air-conducted audio signal.

In one embodiment, the enable module 306 may receive only the bone-conducted audio signal, and comprise a voice activity detect module, or otherwise be operative to perform a voice-activity detect function, so as to detect the presence of audio in the bone-conducted audio signal which is characteristic of speech. Note that such voice-activity detection does not correspond to speaker detection (i.e. the identification of a particular speaker), but rather the detection of speech in general.

Various voice activity detection methods are known in the art, and the present disclosure is not limited in that respect. For example, voice activity detection may be relatively complex, with one or more parameters of the bone-conducted signal determined (e.g. spectral slope, correlation coefficients, log likelihood ratio, cepstral, weighted cepstral, and/or modified distance measures) and compared to corresponding parameters which are characteristic of speech. In one simpler embodiment, it may be assumed that the voice of the user of the personal audio device 202 is dominant in the bone-conducted signal when the user speaks (i.e., the user's voice will dominate over other noise sources). In this case, the voice-activity detection may comprise a simple comparison of the amplitude of the bone-conducted audio signal to a threshold; when the amplitude is above the threshold, it may be assumed that the bone-conducted audio signal contains a voice of the user.

In one embodiment, responsive to a determination that the bone-conducted audio signal contains a voice signal, the enable module 306 outputs a control signal to the biometric module 316 enabling the biometric module 316 to update the stored voice print for an authorised user based on the air-conducted audio signal.

The enablement module 306 may further receive the air-conducted audio signal from ADC 312, and base the determination of whether to enable updates to the stored voice model based on both the bone-conducted audio signal and the air-conducted audio signal.

For example, the enable module 306 may perform a voice-activity detect function on the air-conducted audio signal, so as to detect the presence of audio in the air-conducted audio signal which is characteristic of speech. The enable module 306 may generate an output control signal to the biometric module 316, as described above, when both the air-conducted audio signal and the bone-conducted audio signal contain a voice. In this embodiment, it will be appreciated that the control signal may be generated when portions of the air-conducted audio signal and the bone-conducted audio signal which overlap in time (or are concurrent) both contain a voice. In this way, it may be assumed that the voice in the bone-conducted audio signal and the voice in the air-conducted audio signal both originate from the same person (i.e. the user).

Additionally, or alternatively, the enable module 306 may cross-correlate the bone-conducted audio signal with the air-conducted audio signal. Upon a determination that the bone-conducted audio signal comprises a voice, the enable module 306 may cross-correlate the bone-conducted audio signal (and particularly that portion of the bone-conducted audio signal comprising the voice) with the air-conducted audio signal (particularly that portion of the air-conducted audio signal which is concurrent with the portion of the bone-conducted audio signal comprising the voice), to determine a level of correlation between the two signals. Any suitable correlation algorithm may be used. Responsive to a determination that the two signals correlate (e.g. the correlation exceeds a threshold value), the enable module 306 may output a control signal to the biometric module 316 enabling updates to the stored voice model.

The decision to enable updates to the stored voice model may further be based on authentication of the user of the personal audio device 202 as an authorised user. Thus, in the illustrated embodiment, the system 300 further comprises an authentication module 320 coupled to the enable module 306.

In one embodiment, the authentication module 320 comprises, or is the same as, the biometric module 316. Thus, the system 300 may be utilized to authenticate a user based on the air-conducted audio signal. The biometric module 316 performs a biometric authentication algorithm on the air-conducted audio signal, and compares one or more features extracted from the air-conducted audio signal to a stored voiceprint for an authorised user. On the basis of that comparison, an output is generated which is indicative of a decision as to whether the user of the system 300 is the authorised user or not. This output may be used generally by the system 300 or the personal audio device to permit one or more restricted actions. In the illustrated embodiment, the output is additionally or alternatively passed to the enable module 306, which may enable updates to the stored voiceprint in response.

Additionally or alternatively, the authentication module 320 may comprise one or more alternative authentication mechanisms. For example, the authentication module 320 may implement authentication based on one or more alternative biometrics, such as ear biometrics, fingerprints, iris or retina scanning. For example, the authentication module 320 may implement an input-output mechanism for accepting and authorising the user based on a passphrase, password, or pin number entered by the user and associated with the authorised user. The input-output mechanism may pose a question to the user based on the passphrase, password or pin number, the answer to which does not reveal the entire passphrase, password or pin number. For example, the question may relate to a particular character or digit of the passphrase, password or pin number (e.g., "what is the third character of the password?"). The question may require the performance of a mathematical operation on the pin number or part thereof (e.g., "what is the first digit of the pin number plus three?"). The input-output mechanism may output the question audibly (e.g. through playback over a loudspeaker), so that only the user can hear the question. Further, the input-output mechanism may provide for input of the answer audibly (e.g. through the microphone 310), or via some other input mechanism, such as a touchscreen, keypad, keyboard, or similar.

According to embodiments of the disclosure, the system 300 is operable to update a stored voiceprint for an authorised user following successful authentication of a user as that authorised user.

Thus, a user is enrolled with the biometric module 316 (i.e. through the acquisition of voice model data) and a voiceprint 318 stored for the user. The user may later seek authentication via the system 300, and thus further voice biometric data is acquired for that purpose as described above. If the authentication is successful, the biometric module 316 may return a positive authentication message to the enable module 306, enabling updates to the stored voiceprint 318 for the user based on the acquired voice data.

If the authentication is unsuccessful, the biometric module 316 may return a negative authentication message. However, the system 300 comprises one or more further authentication mechanisms 320. If the user is subsequently successfully authenticated via one or more of these mechanisms, the enable module 306 may issue a control signal to the biometric module 316 to update the stored voice model 318 for the user with the data which was acquired as part of the unsuccessful voice biometric authentication attempt.

Additionally or alternatively, the update of the stored voice model 318 for the user may be based on voice model data which is acquired solely for that purpose (i.e. rather than as part of a successful or failed authentication attempt). Once successfully authenticated, the system 300 may acquire further voice model data utilizing the microphone 310 with or without the user's knowledge. The acquisition of such data may be periodic, continuous, at a defined schedule or according to detection of one or more defined events.

The stored voice model 318 may be updated by the biometric module 316 based on data within the air-conducted audio signal which overlaps in time or is concurrent with the data in the bone-conducted audio signal which comprises the voice signal. For example, in some embodiments, the detected speech in the bone-conducted audio signal may be used to gate portions of the air-conducted audio signal to be used for the update to the stored voice model. Time stamps may be applied to the data in each audio signal for this purpose. Thus, the time stamps of data frames of the bone-conducted audio signal which it is detected comprise speech, may be used to identify data frames of the air-conducted audio signal to be used in updating the stored voice model.

Figure 4:
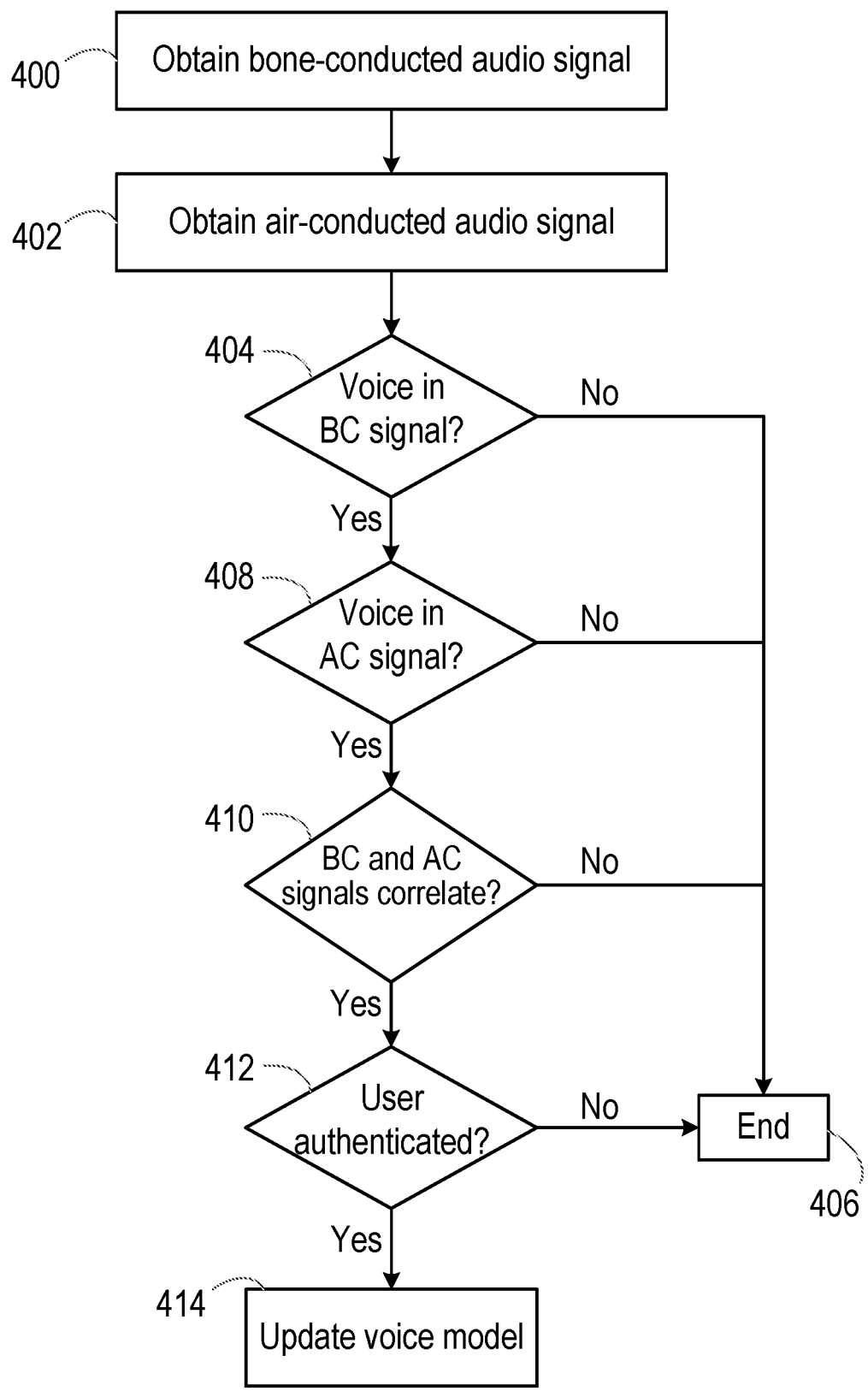
FIG. 4 is a flowchart of a method according to embodiments of the disclosure.

FIG. 4 is a flowchart of a method according to embodiments of the disclosure.

In step 400, the biometric system obtains a bone-conducted audio signal, e.g. using any of the microphones 24, 34, 44, 54, 64 or 302. In step 402, the biometric system obtains an air-conducted audio signal, e.g. using any of the microphones 66, 110 or 310. Although described as separate steps, those skilled in the art will appreciate that these steps are contemporaneous, with the bone-conducted audio signal and the air-conducted audio signal relating to an audio environment at the same time.

In step 404, the biometric system determines whether the bone-conducted audio signal comprises any voice activity. Various voice activity detection methods are known in the art, and the present disclosure is not limited in that respect. For example, voice activity detection may be relatively complex, with one or more parameters of the bone-conducted signal determined (e.g. spectral slope, correlation coefficients, log likelihood ratio, cepstral, weighted cepstral, and/or modified distance measures) and compared to corresponding parameters which are characteristic of speech. In one simpler embodiment, it may be assumed that the voice of the user of the personal audio device 202 is dominant in the bone-conducted signal when the user speaks (i.e., the user's voice will dominate over other noise sources). In this case, the voice-activity detection may comprise a simple comparison of the amplitude of the bone-conducted audio signal to a threshold; when the amplitude is above the threshold, it may be assumed that the bone-conducted audio signal contains a voice of the user.

If there is no voice activity in the bone-conducted audio signal, it may be assumed that no-one is speaking, and the method ends in step 406. If there is voice activity, the method proceeds to step 408, in which the biometric system determines whether the air-conducted audio signal comprises any voice activity. Again, any suitable voice activity detection method may be used.

If there is no voice activity in the air-conducted audio signal, it may be assumed that the voice microphone is not working properly, or is in such a noisy environment that the voice cannot be detected, and the method ends in step 406. If there is voice activity in the air-conducted audio signal, the method proceeds to step 410, in which the biometric system determines whether the air-conducted audio signal and the bone-conducted audio signal correlate with each other.

For example, a correlation value indicative of the level of correlation between the two signals may be compared to a threshold: if the correlation value exceeds the threshold, it may be determined that the signals correlate; if the correlation value is less the threshold, it may be determined that the signals do not correlate. Any suitable cross-correlation method may be used, and the present disclosure is not limited in that respect.

If the two audio signals do not correlate, it may be assumed that the voice microphone has detected significant levels of noise (e.g. the presence of other speakers). In this case, it may be inappropriate for the stored voice template to be updated based on the air-conducted voice signal, and thus the method proceeds to step 406 and ends. If the audio signals do correlate, the method proceeds to step 412, in which the biometric system determines whether the user is authenticated as the authorised user or not.

The user may be authenticated as an authorised user via any suitable mechanism. For example, the user may be authenticated based on a voice biometric algorithm performed on the air-conducted audio signal obtained in step 402. Alternatively authentication may be based on one or more alternative biometrics, such as ear biometrics, fingerprints, iris or retina scanning, or non-biometric authentication, such as input of a passphrase, password, or pin number.

If the user is not authenticated as the authorised user, the method ends in step 406, as the stored voice template for the authorised user should not be updated based on a different person's voice. If the user is authenticated as the authorised user, the method proceeds to step 414, in which the voice model for the user is updated based on the air-conducted audio signal obtained in step 402.

The voice model may be updated based on those parts of the air-conducted audio signal which correspond to the parts of the bone-conducted audio signal comprising speech. For example, those parts of the bone-conducted audio signal containing speech may be used to gate the air-conducted audio signal, and so isolate the user's speech from other noise or speech sources present in the air-conducted audio signal.

For example, parameters of the stored voice model may be updated as follows:

$$\mu_{new} = \alpha \mu_{stored} + (1-\alpha)\mu_{calc}$$

where $\alpha$ is a coefficient between 0 and 1, $\mu_{new}$ is the new (i.e. updated) stored voice model parameter, $\mu_{stored}$ is an old (i.e. previous) stored voice model parameter, and $\mu_{calc}$ is the voice model data parameter newly acquired. Thus the new voice model is based on a combination of the previous voice model and the newly acquired voice model data. Of course, alternative expressions could be used to achieve much the same effect. The value of the coefficient α may be set as required to achieve a desired rate of change of the stored voice model. For example, it may be desired that the voice model changes relatively slowly, so as to make the system difficult to break. α may therefore be set at a value which is close to 1 (e.g. 0.95 or higher).

Embodiments of the disclosure thus provide methods, apparatus and systems for authenticating a user.

Embodiments may be implemented in an electronic, portable and/or battery powered host device such as a smartphone, an audio player, a mobile or cellular phone, a handset. Embodiments may be implemented on one or more integrated circuits provided within such a host device. Alternatively, embodiments may be implemented in a personal audio device configurable to provide audio playback to a single person, such as a smartphone, a mobile or cellular phone, headphones, earphones, etc. See FIGS. 1a to 1f. Again, embodiments may be implemented on one or more integrated circuits provided within such a personal audio device. In yet further alternatives, embodiments may be implemented in a combination of a host device and a personal audio device. For example, embodiments may be implemented in one or more integrated circuits provided within the personal audio device, and one or more integrated circuits provided within the host device.

It should be understood—especially by those having ordinary skill in the art with the benefit of this disclosure—that that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments and implementations likewise, with the benefit of this disclosure, will be apparent to those having ordinary skill in the art, and such embodiments should be deemed as being encompassed herein. Further, those having ordinary skill in the art will recognize that various equivalent techniques may be applied in lieu of, or in conjunction with, the discussed embodiments, and all such equivalents should be deemed as being encompassed by the present disclosure.

The skilled person will recognise that some aspects of the above-described apparatus and methods, for example the discovery and configuration methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims or embodiments. The word "comprising" does not exclude the presence of elements or steps other than those listed in a claim or embodiment, "a" or "an" does not exclude a plurality, and a single feature or other unit may fulfil the functions of several units recited in the claims or embodiments. Any reference numerals or labels in the claims or embodiments shall not be construed so as to limit their scope.

Although the present disclosure and certain representative advantages have been described in detail, it should be understood that various changes, substitutions, and alterations can be made herein without departing from the spirit and scope of the disclosure as defined by the appended claims or embodiments. Moreover, the scope of the present disclosure is not intended to be limited to the particular embodiments of the process, machine, manufacture, compositions of matter, means, methods, or steps, presently existing or later to be developed that perform substantially the same function or achieve substantially the same result as the corresponding embodiments herein may be utilized. Accordingly, the appended claims or embodiments are intended to include within their scope such processes, machines, manufacture, compositions of matter, means, methods, or steps.

The invention claimed is:

1. A method in a biometric authentication system, the biometric authentication system for authenticating a user based on a comparison of audio signals to a stored voice model for an authorised user, the stored voice model being used for speaker recognition of the authorised user, the method comprising:

obtaining a first audio signal that comprises a representation of a bone-conducted signal, wherein the bone-conducted signal is conducted via at least part of the user's skeleton;

obtaining a second audio signal that comprises a representation of an air-conducted signal;

responsive to a determination that the first audio signal comprises a voice signal, enabling updates to the stored voice model for the authorised user based on the second audio signal; and further to the enablement of updates to the stored voice model for the authorised user, and responsive to authentication of the user as the authorised user, using the second audio signal to update the stored voice model for the authorised user.

2. The method of claim 1, wherein the user is authenticated as the authorised user based on a biometric process.

3. The method of claim 2, wherein the biometric process comprises a voice biometric process based on the second audio signal.

4. The method of claim 1, wherein the user is authenticated as the authorised user based on a non-biometric process.

5. The method of claim 4, wherein the non-biometric process comprises entry of a password for the authorised user.

6. The method of claim 1, wherein the step of enabling updates to the stored voice model for the authorised user is further responsive to a determination that the second audio signal comprises a voice signal.

7. The method of claim 1, wherein the step of enabling updates to the stored voice model for the authorised user based on the second audio signal is further based on a comparison between the first and second audio signals.

8. The method of claim 7, wherein the step of enabling updates to the stored voice model for the authorised user based on the second audio signal is responsive to detection of a correlation between the first and second audio signals.

9. The method of claim 8, wherein the step of enabling updates to the stored voice model for the authorised user based on the second audio signal is responsive to detection of a correlation between a part of the first audio signal identified as comprising the voice signal, and a corresponding part of the second audio signal.

10. The method of claim 1, wherein the first audio signal is generated by an in-ear transducer.

11. The method of claim 1, wherein the second audio signal is generated by a microphone which is external to the user's ears.

12. A biometric authentication system for authenticating a user based on a comparison of audio signals to a stored voice model for an authorised user, the stored voice model being used for speaker recognition of the authorised user, the biometric authentication system comprising:
   a first input for obtaining a first audio signal, the first audio signal comprising a representation of a bone-conducted signal, wherein the bone-conducted signal is conducted via at least part of the user's skeleton;
   a second input for obtaining a second audio signal, the second audio signal comprising a representation of an air-conducted signal;
   an enablement module operable to determine whether the first audio signal comprises a voice signal and to enable updates to the stored voice model for the authorised user based on the second audio signal, responsive to a determination that the first audio signal comprises a voice signal; and
   further comprising a biometric module operable to update the stored voice model for the authorised user using the second audio signal responsive to authentication of the user as the authorised user.

13. The biometric authentication system of claim 12, further comprising an authentication module operable to authenticate the user as the authorised user based on a biometric process.

14. The biometric authentication system of claim 13, wherein the biometric process comprises a voice biometric process based on the second audio signal.

15. The biometric authentication system of claim 12, further comprising an authentication module operable to authenticate the user as the authorised user based on a non-biometric process.

16. The biometric authentication system of claim 15, wherein the non-biometric process comprises entry of a password for the authorised user.

17. The biometric authentication system of claim 12, wherein the enablement module is further operable to enable updates to the stored voice model for the authorised user based on the second audio signal responsive to a determination that the air-conducted signal comprises a voice signal.

18. The biometric authentication system of claim 12, wherein the enablement module is further operable to enable updates to the stored voice model for the authorised user based on the second audio signal based on a comparison of the first and second audio signals.

19. The biometric authentication system of claim 18, wherein the enablement module is further operable to enable updates to the stored voice model for the authorised user based on the second audio signal responsive to a detection of a correlation between the first and second audio signals.

20. The biometric authentication system of claim 12, wherein the first input is connectable to a transducer adapted for insertion into a user's ear.

21. The biometric authentication system of claim 12, wherein the second input is connectable to a voice microphone.

22. The biometric authentication system of claim 12, wherein the biometric authentication system is provided on a single integrated circuit.

23. An electronic apparatus, for authenticating a user based on a comparison of audio signals to a stored voice model for an authorised user, the stored voice model being used for speaker recognition of the authorised user, the electronic apparatus comprising processing circuitry and a non-transitory machine-readable medium storing instructions which, when executed by the processing circuitry, cause the electronic apparatus to:
   obtain a first audio signal that comprises a representation of a bone-conducted signal, wherein the bone-conducted signal is conducted via at least part of the user's skeleton;
   obtain a second audio signal that comprises a representation of an air-conducted signal;
   responsive to a determination that the first audio signal comprises a voice signal, enable updates to the stored voice model for the authorised user based on the second audio signal; and
   update the stored voice model for the authorised user using the second audio signal responsive to authentication of the user as the authorised user.

24. The electronic apparatus according to claim 23, wherein the electronic apparatus comprises a personal audio device, or a host electronic device.

25. A non-transitory machine-readable medium for authenticating a user based on a comparison of audio signals to a stored voice model for an authorised user, the stored voice model being used for speaker recognition of the authorised user, the medium storing instructions which, when executed by processing circuitry, cause an electronic apparatus to:
- obtain a first audio signal that comprises a representation of a bone-conducted signal, wherein the bone-conducted signal is conducted via at least part of the user's skeleton;
- obtain a second audio signal that comprises a representation of an air-conducted signal;
- responsive to a determination that the first audio signal comprises a voice signal, enable updates to the stored voice model for the authorised user based on the second audio signal; and
- update the stored voice model for the authorised user using the second audio signal responsive to authentication of the user as the authorised user.

* * * * *